(12) United States Patent
Nakajima et al.

(10) Patent No.: US 7,090,409 B2
(45) Date of Patent: Aug. 15, 2006

(54) OPTICAL FUNCTIONING COMPONENT AND OPTICAL CONNECTOR HAVING OPTICAL FUNCTIONING COMPONENT

(75) Inventors: Masahiro Nakajima, Chiba (JP); Kouji Minami, Chiba (JP); Junji Taira, Chiba (JP); Shin Sumida, Chiba (JP); Ryo Nagase, Tokyo (JP); Syuichi Yanagi, Tokyo (JP)

(73) Assignee: Nippon Telegraph and Telephone Corporation and Seikoh Giken Co., Ltd. (JP)

( * ) Notice: Subject to any disclaimer, the term of this patent is extended or adjusted under 35 U.S.C. 154(b) by 260 days.

(21) Appl. No.: 10/413,353

(22) Filed: Apr. 14, 2003

(65) Prior Publication Data

US 2004/0017982 A1    Jan. 29, 2004

(30) Foreign Application Priority Data

Apr. 16, 2002   (JP) .............................. 2002-113411

(51) Int. Cl.
*G02B 6/36* (2006.01)

(52) U.S. Cl. .......................... 385/77; 385/53; 385/76; 385/140

(58) Field of Classification Search ................. 385/77, 385/78, 79, 80–85
See application file for complete search history.

(56) References Cited

U.S. PATENT DOCUMENTS 5,677,976 A   10/1997   Takahashi ................... 385/140
6,318,905 B1 *  11/2001   Valencia et al. ............... 385/78
6,456,774 B1 *   9/2002   Lin ............................. 385/140

FOREIGN PATENT DOCUMENTS

| JP | 06294911 | 10/1994 |
|----|----------|---------|
| JP | 08-334649 | * 12/1996 |
| JP | 09061632 | 3/1997 |
| JP | 10307231 | 11/1998 |
| JP | 00199821 | 7/2000 |
| JP | 01027711 | 1/2001 |

OTHER PUBLICATIONS

Patent Abstracts of Japan, publication No. JP2000199821, application No. 10-377319 published Jul. 18, 2000.

* cited by examiner

*Primary Examiner*—Jennifer Doan
(74) *Attorney, Agent, or Firm*—Adams & Wilks (57) ABSTRACT

An optical functioning component has a tubular housing with a front end side having substantially the same shape as that of a front end of a removable plug housing of an optical connector plug. A rear end side of the tubular housing has a shape configured for connection to the optical connector plug when the plug housing is removed from the optical connector plug. A ferrule is provided on the front end side of the tubular housing and has a mechanism capable of attenuating, cutting-off, reflecting or absorbing a specific wavelength of light. An optical connection sleeve is connected to an end of the ferrule. A frame supports the ferrule and the optical connection sleeve and is mounted in the tubular housing for undergoing axial movement therein by a preselected amount.

24 Claims, 7 Drawing Sheets

OPTICAL FUNCTIONING COMPONENT AND OPTICAL CONNECTOR HAVING OPTICAL FUNCTIONING COMPONENT

BACKGROUND OF THE INVENTION

1. Field of the Invention

The present invention relates to an optical functioning component provided in an optical connector comprising an optical connector-adaptor and an optical connector-plug for carrying out a predetermined amount of attenuation.

2. Description of the Related Art

There has been used conventionally an optical functioning component having a mechanism for attenuating, cutting off, reflecting or absorbing light by means of a fiber or a filter, which can attenuate light or cut off, reflect or absorb a specific wavelength of light, such as an optical attenuator for carrying out a predetermined amount of light-attenuation by means of a metal-doped attenuation fiber or an attenuation filter formed by an optical absorber, the optical attenuator being provided in an optical connector comprising an optical connector-adaptor and an optical connector-plug.

Such optical functioning component has one end formed in a shape roughly equal to an optical connector-plug so as to engage with a connecting portion to which the optical connector-plug of an optical connector-adaptor is connected and the other end formed in a shape equal to a connecting portion of the optical connector-adaptor so that a front end of the optical connector-plug can be connected.

Figure 7:
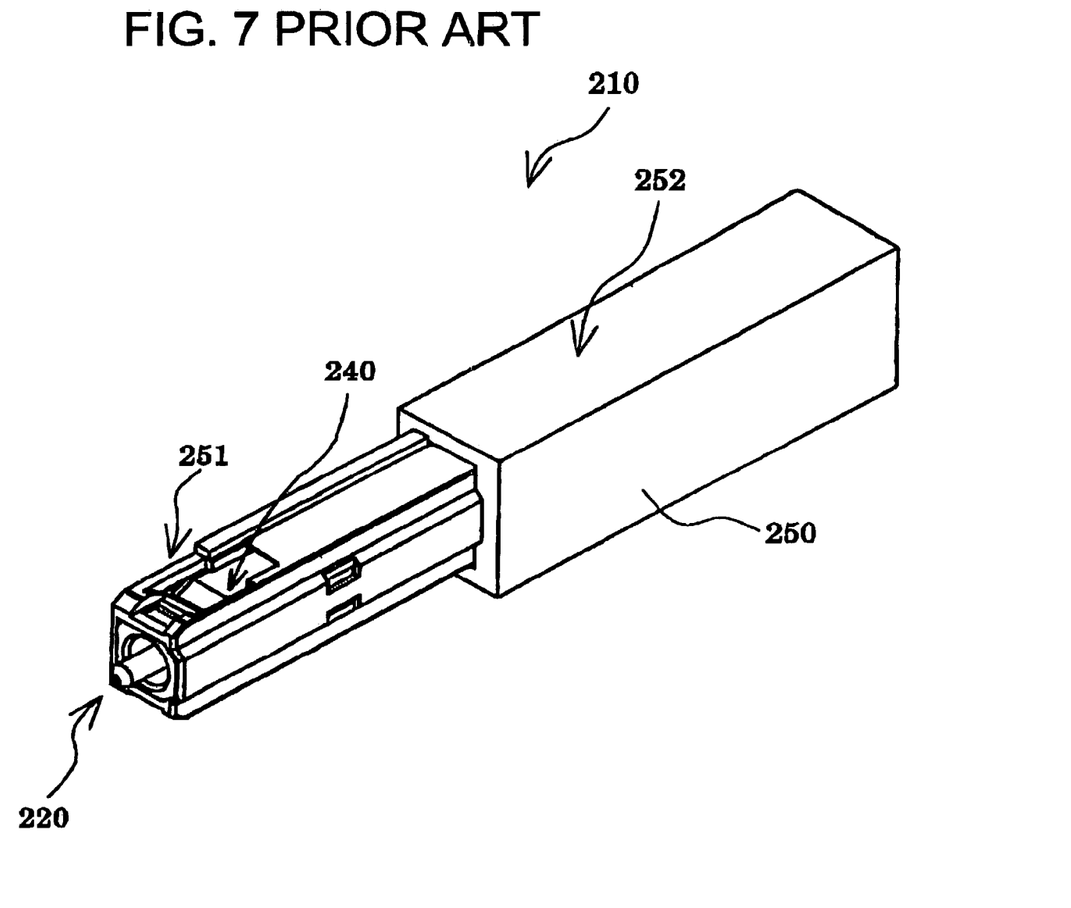
FIG. 7 is a perspective view of an optical functioning component according to a related art.

Such example is shown in FIG. 7. FIG. 7 is a perspective view of an optical functioning component in accordance with a related art.

As shown in FIG. 7, a conventional optical functioning component 210 is an optical functioning component used for an MU-type optical connector and comprises a ferrule 220 having an attenuation mechanism or a mechanism for cutting off, reflecting or absorbing a specific wavelength of light, an optical connection sleeve for holding an end of the ferrule 220, the optical connection sleeve being not shown in the drawing, a frame 240 for holding the optical connection sleeve and a housing 250 for holding the frame 240 inside so that the frame 240 can move axially and freely by a predetermined amount.

An insert portion 251 to be inserted and held in an MU-type optical connector-adaptor is provided on the front end side of the housing 250 and the frame 240. On the rear end side, there is provided a plug holding portion 252 in which an MU-TYPE optical connector-plug is inserted and held.

The insert portion 251 is formed in a shape equal to the MU-type optical connector-plug, while the plug holding portion 252 is formed in a shape equal to a connecting portion of the MU-type optical connector-adaptor.

The ferrule 220 of an optical connector-plug inserted and held in the plug holding portion 252 of the housing 250 is adapted to contact with another ferrule 220, which has an attenuation mechanism or a mechanism for cutting off, reflecting or absorbing a specific wavelength of light in the optical connection sleeve, at respective end surfaces to be opposingly connected each other.

In such an optical functioning component 210, holding an optical connector-plug in the plug holding portion 252 and inserting and holding the insert portion 251 in a connecting portion of an optical connector adaptor allow optical connection of a pair of optical connector-plugs connected opposingly in an optical connector-adaptor to be attenuated by a predetermined amount.

The above-described conventional optical functioning component, however, has a problem that, in an optical connector-adaptor capable of optical-connection while a plurality of optical connector-adaptors such as two or eight, for example, are provided in parallel, inserting and holding the optical functioning component in respective connecting portions of an optical connector-adaptor requires a predetermined space to be provided between adjoining connecting portions of the optical connector-adaptors so that respective plug holding portion sides of adjoining optical functioning components would not contact each other, which causes the optical connector-adaptor not to be miniaturized.

Furthermore, an optical connector-adaptor for holding a plurality of optical connector-plugs provided in parallel without using any optical functioning component should be formed separately from an optical connector-adaptor using an optical functioning component, which causes a cost to be high.

In the case that an adaptor holding portion of a housing of an optical functioning component is thinly formed so that a space between connecting portions of an optical connector adaptor would be small, especially in an optical functioning component for a small size optical connector such as an MU-type optical connector, a strength of the adaptor holding portion cannot be maintained, so that the adaptor holding portion would be easily broken.

Moreover, in the conventional optical functioning component, it is necessary to provide outside an adapter a rear end having a larger size than the cross-sectional area of a plug in order to insert and hold an optical connector-plug, which makes the whole length of the optical functioning component long, so that a ferrule having an optical function should be made long. The ferrule length of a conventional MU-type optically fixed attenuator, for example, is 16 mm or more, so that many expensive attenuation fibers should be used, which causes a cost to be high.

SUMMARY OF THE INVENTION

In view of the above, an aspect of the invention is to provide an optical functioning component such as an optical attenuator which can be miniaturized with its strength maintained and which has a decreased number of parts, thereby reducing the overall manufacturing cost.

A first mode of the invention for solving the above problems is an optical functioning component comprising a ferrule having an attenuation mechanism or a mechanism capable of cutting off, reflecting or absorbing a specific wavelength, the ferrule being provided on a front end side, an optical connection sleeve for holding a rear end of the ferrule, a frame for holding the ferrule and the optical connection sleeve and a housing for holding the frame so that the frame can move axially and freely by a predetermined amount, wherein a front end side of the housing has a roughly equal shape to a front end of a plug housing of an optical connector-plug connectable to an optical connector-adaptor engaged with the former front end side, and a rear end of the housing has a shape that the optical connector-plug can engage when the plug housing is removed.

A second mode of the invention is an optical functioning component as in the first mode, wherein the ferrule comprises a ferrule cylinder and a collar member fitted in an axially middle portion of an outer circumference of the ferrule cylinder.

A third mode of the invention is an optical functioning component as in the first or second mode, wherein the attenuation mechanism or the mechanism capable of cutting off, reflecting or absorbing a specific wavelength of the ferrule is an attenuation fiber or a fiber capable of cutting off, reflecting or absorbing a specific wavelength, which is held by the ferrule cylinder.

A fourth mode of the invention is an optical functioning component as in the third mode, wherein the attenuation fiber is a metal-doped optical fiber.

A fifth mode of the invention is an optical functioning component as in the third or fourth mode, wherein the ferrule cylinder has 1.25 or 2.5 mm of outer diameter and the attenuation fiber or fiber capable of cutting off, reflecting or absorbing a specific wavelength has 10 to 15 mm of axial length.

A sixth mode of the invention is an optical functioning component as in the first or second mode, wherein the attenuation mechanism or mechanism capable of cutting off, reflecting or absorbing a specific wavelength of the ferrule is an attenuation filter or a filter capable of cutting off, reflecting or absorbing a specific wavelength, which is held in the ferrule.

A seventh mode of the invention is an optical functioning component as in any one of the first to sixth modes, wherein engagement with the plug frame can be released by means of a jig.

A eighth mode of the invention is an optical functioning component as in any one of the first to seventh modes, wherein the optical connector-plug and the optical connector-adaptor are of an SC-type or an MU-type.

In accordance with the invention, providing an optical functioning component such as an optical attenuator in which its rear end side is in a shape roughly equal to a housing of an optical connector-plug allows a space between adjacent optical functioning components to be small even in the case of plural provision in parallel in an optical connector-adaptor, so that miniaturization can be achieved. Moreover, a connecting portion between an optical functioning component and an optical connector-plug is not necessary to be provided outside an adaptor, so that the whole length can be shortened.

BRIEF DESCRIPTION OF THE DRAWINGS

The above and further objects and novel features of the invention will more fully appear from the following detailed description when the same is read in connection with the accompanying drawings in which.

DETAILED DESCRIPTION OF THE INVENTION

The invention will be described in detail hereinafter on the basis of embodiments.

(Embodiment 1)

Figure 1A:
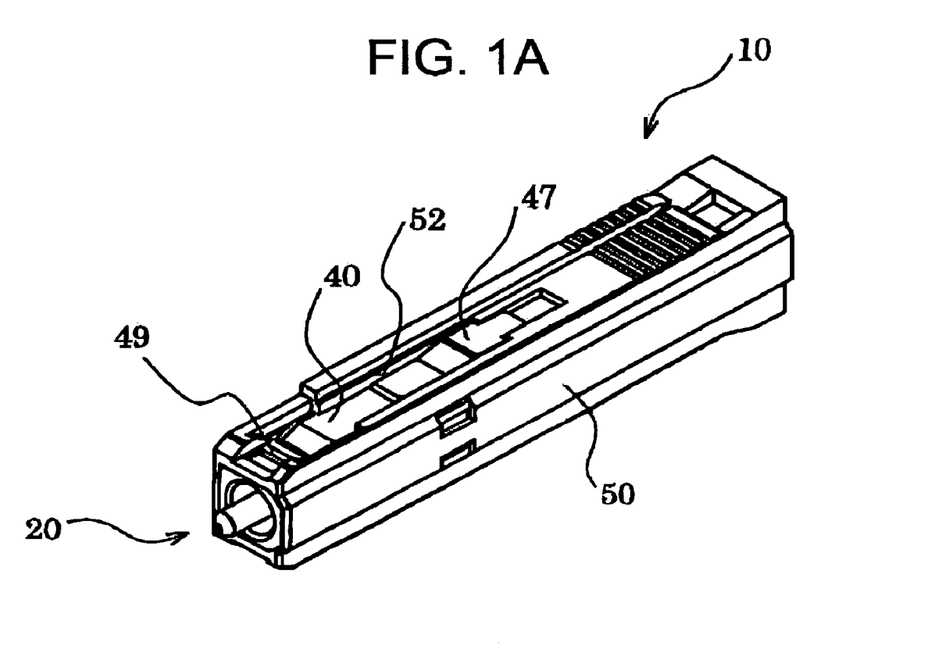
FIGS. 1A–1B are a perspective view of an optical functioning component and an optical connector-adaptor, respectively, according to a first embodiment of the invention.
Figure 1B:
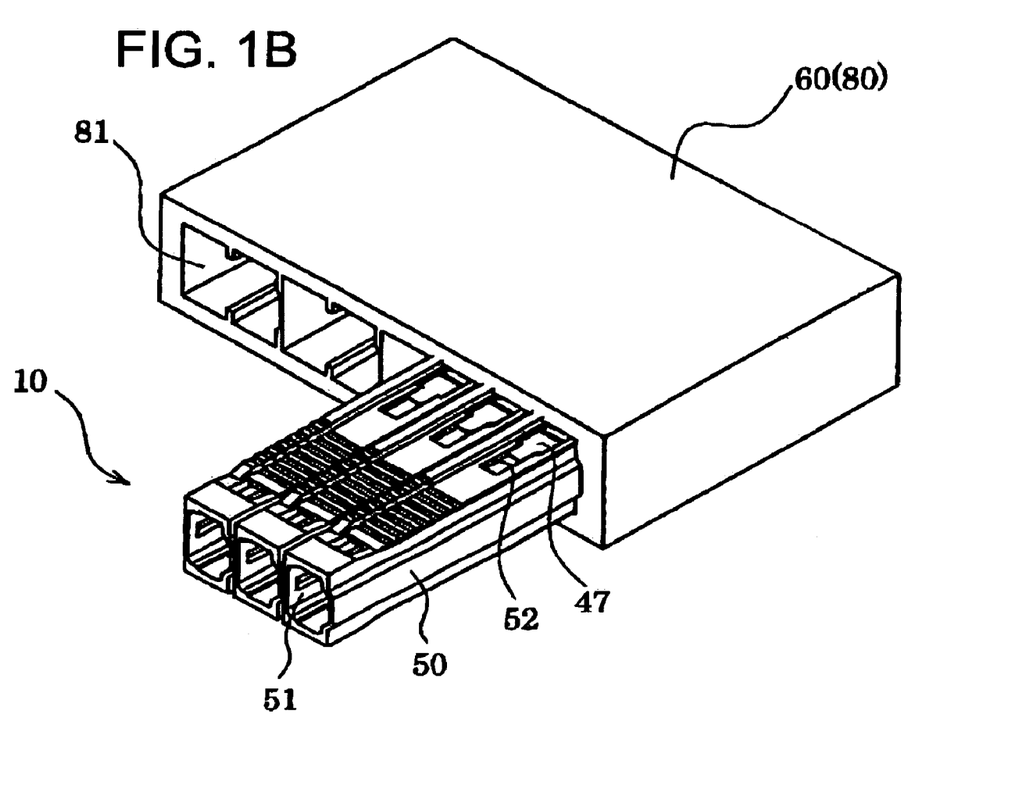
Figure 2A:
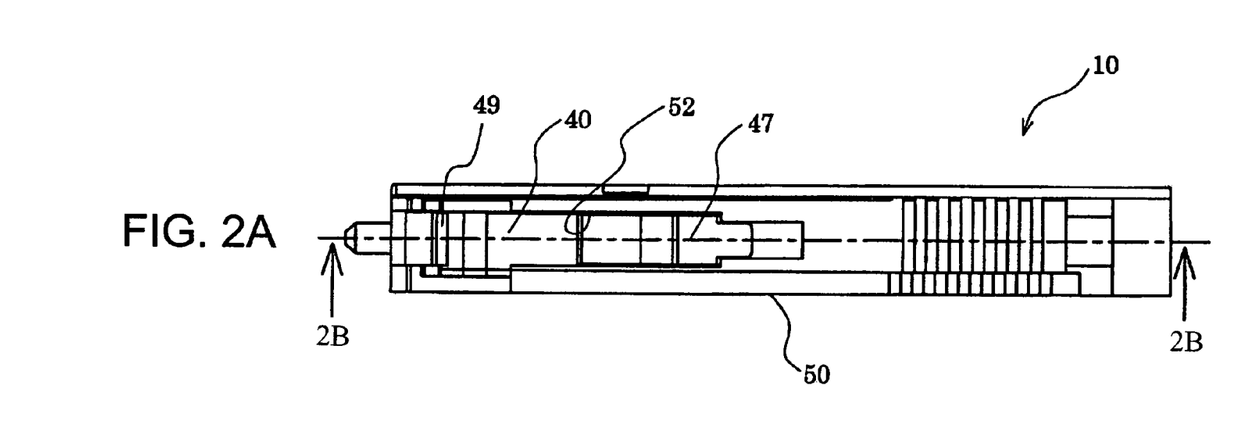
FIGS. 2A–2B are a plan view and a cross-sectional view taken along the line 2B—2B in FIG. 2A, respectively, of an optical functioning component according to a first embodiment of the invention.
Figure 2B:
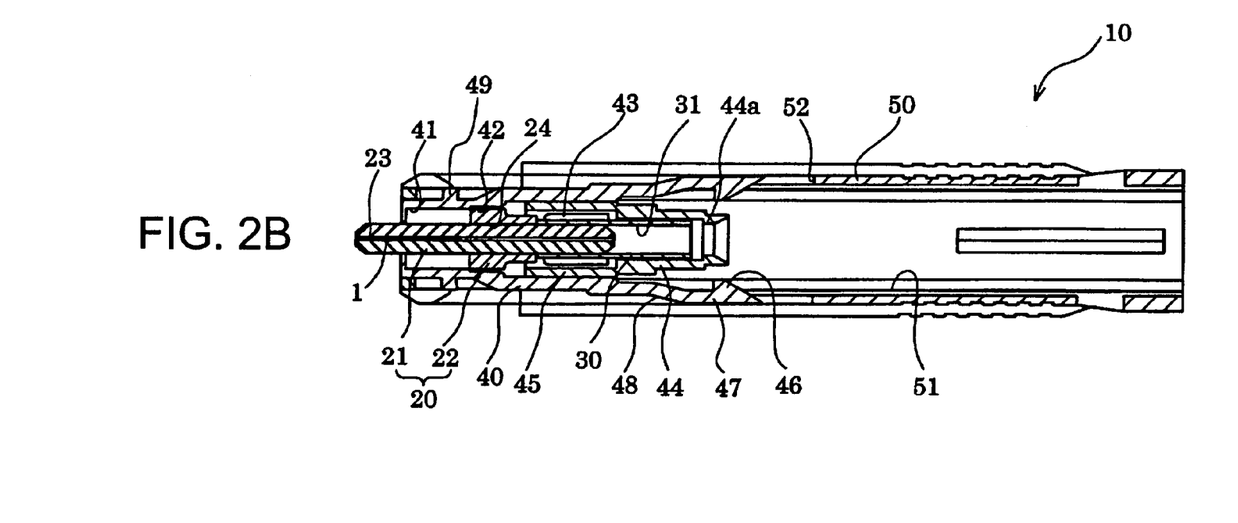

FIG. 1A is a perspective view of an optical functioning component according to a first embodiment of the invention and FIG. 1B is a perspective view of an optical connector-adaptor. FIG. 2A is a side view of one side of an optical functioning component and FIG. 2B is a cross-sectional view of the optical functioning component taken along line 2B—2B in FIG. 2A.

As shown in the drawings, an optical functioning component 10 comprises a ferrule 20 having an attenuation mechanism or a mechanism capable of cutting off, reflecting or absorbing a specific wavelength, the ferrule 20 being provided on a front end side, an optical connection sleeve 30 for holding at an end thereof a base end of the ferrule 20, a frame 40 for holding the ferrule 20 and the optical connection sleeve 30 and a housing 50 for holding the frame 40.

The ferrule 20 comprises a generally cylindrical member or ferrule cylinder 21, which is formed by means of a ceramic material such as zirconium, a plastic material and a glass material such as crystallized glass, boronic silica grass and quartz and which has a cylinder shape, for example, and a collar member 22, which is fixed on an outer circumferential surface of the ferrule cylinder 21 at an almost axially middle portion thereof and which is formed by means of a metal material such as stainless, for example.

The ferrule cylinder 21 is provided with an optical fiber insert hole 23 axially passing through the cylinder. The optical fiber insert hole 23 holds inside an attenuation fiber 1 formed by doping a core of an optical fiber such as zirconium with metal or the like, for example. That is to say, the ferrule 20 has an attenuation mechanism since it holds the attenuation fiber 1. The ferrule 20 holding the attenuation fiber 1 functions as an optically fixed attenuator when it is used for the optical functioning component 10. Otherwise, selecting as a fiber held in the ferrule 20 a fiber capable of cutting off, reflecting or absorbing a specific wavelength of light to hold the fiber inside the optical fiber insert hole 23 of the ferrule cylinder allows the ferrule 20 to have a mechanism capable of cutting off, reflecting or absorbing a specific wavelength of light. Properly selecting a fiber to be held by the ferrule 20 and using the fiber for an optical functioning component, as described above, enable various kinds of optical functioning component 10. As a fiber capable of reflecting a specific light wavelength, provided Fiber Bragg Grating (FBG) in which UV is radiated to form a grating structure inside a fiber. Such ferrule cylinder 21 has 1.25 mm of outer diameter since the optical functioning component 10 is used for an MU-type of optical connector in this embodiment.

Furthermore, the ferrule cylinder 21 as described above is provided with a collar member 22 fitted and fixed in an axially middle portion of an outer circumference thereof.

The collar member 22 is provided with a ferrule cylinder holding hole 24 having its inner diameter a little bit smaller than the outer diameter of the ferrule cylinder 21. The base end of the ferrule cylinder 21 is inserted in the ferrule cylinder holding hole 24. The collar member 22 is fitted and fixed in an outer circumferential surface of the ferrule cylinder 21 at an almost axially middle portion thereof. The way of fixing the ferrule cylinder 21 and the collar member 22 is not especially limited. They may be fixed by pressure, adhesion with adhesive or welding.

The collar member 22 has its outer diameter on the front end side larger than that of the rear end side. A rim of the front end surface having the large diameter contacts with a bump 42 in the frame 40, so that the frame 40 would be limited to move to the front end side. The rear end surface of the collar member 22 contacts with a front end surface of the optical connection sleeve 30, so that the movement to the rear end side would be limited. That is to say, the ferrule 20 is held inside the frame 40 so as to be limited to move in the axial and radial directions.

The optical connection sleeve 30 contacts end surfaces of the ferrule cylinder 21 held in the frame 40 and a ferrule 120 of an optical connector-plug 90 described later in detail to connect the ferrule cylinder 21 and the ferrule 120 face to face. The optical connection sleeve 30 is provided with a ferrule insert hole 31 into which the ferrule cylinder 21 can be axially inserted. The ferrule insert hole 31 has its inner diameter equal to or a little bit smaller than the outer diameter of the ferrule cylinder 21. The optical connection sleeve 30 is axially provided in its outer circumferential surface with a slit not shown in the drawings. The optical connection sleeve 30 elastically changes its form in a direction that an opening of the slit is widen so as to be able to closely hold the ferrule cylinder 21 when the ferrule cylinder 21 is inserted into the ferrule insert hole 31 of the optical connection sleeve 30.

The frame 40 holding the ferrule 20 and the optical connection sleeve 30 is formed by means of a plastic material whose cross-section is in a shape of rectangular cylinder and the frame 40 is provided with a holding hole 41 axially passing through the frame 40.

The holding hole 41 is provided on its rear end side with a bump 42 due to difference between inner diameters by making an inner diameter of the rear end side larger than that of the front end side. The bump 42 contacts with the rim of the front end surface of the collar member 22 so that the collar member 22 would be limited to move to the front end side.

The holding hole 41 is provided on its rear end side with a first cylinder 43 for holding the front end side of the optical connection sleeve 30. The first cylinder 43 holds the optical connection sleeve 30 in the frame 40 together with a sleeve holding portion 45, which is inserted and held on the rear end side of the holding hole 41 and has a second cylinder 44.

As described above, the second cylinder 44 of the sleeve holding portion 45 for holding the optical connection sleeve 30 is provided at its rear end with a limiting portion 44a for limiting axial movement of the optical connection sleeve 30 to the rear end side by contacting with the rear end surface of the optical connection sleeve 30.

That is to say, the optical connection sleeve 30 and the ferrule 20 are held between the bump 42 of the frame 40 and the limiting portion 44a of the second cylinder 44 to be limited to move axially.

Such frame 40 is held in the housing 50 so as to be able to axially and freely move by a predetermined amount. In detail, the housing 50 is formed by means of a plastic material comprising a cylinder having a roughly rectangular cross-section and is provided with a frame holding hole 51 axially passing through the housing 50. The width in up-down and left-right directions of surfaces crossing at right angles in the axial direction of the housing 50 of the frame holding hole 51 is roughly the same from a front end to a rear end of the housing 50 in this embodiment. The rear end of the housing 50 is thus in the roughly the same shape as that of the front end inserted into an optical connector-adaptor 60 described later. That is to say, the width in up-down and left-right directions of outer circumferential surfaces crossing at right angles in the axial direction of the housing 50 is roughly the same from the front end to the rear end, so that it is arranged that only a frame portion holding a housing ferrule of a conventional optical connector-adaptor is inserted and held. Furthermore, the outer circumferential surface of the housing 50 is provided on its opposed surfaces with openings 52 formed in a predetermined axial length for making the frame holding hole 51 communicate with the outside.

On the rear end side of the frame 40 there is provided a pair of ratchet portions 47 disposed so as to sandwich the second cylinder 44 and the ratchet portions 47 have a lock pawl 46 at their front end. This pair of ratchet portions 47 curves so as to be apart from each other, so that a bevel 48 is formed at a part of the outer circumferential surface. Due to the bevel 48, the pair of ratchet portions 47 of a frame 40 elastically changes their shapes so as to be close to each other to be inserted when the frame 40 is inserted into the frame holding hole 51 of the housing 50 from the rear end side of the frame 40, and then, a rear end side in relation to the bevel 48 projects into the opening 52. Accordingly, the frame 40 is held in the housing 50 so as to be able to axially and freely move by a predetermined amount.

The outer circumferential surface of the frame 40 is provided on its front end side with an engagement projection 49, which contacts with a front end side edge of the opening 52 of the housing 50, so that axial movement to the front end side is limited. The engagement projection 49 also engages with a ratchet portion 74 provided in the optical connector-adaptor 60, which is described later in detail, to be held in the optical connector-adaptor 60.

The lock pawl 46 of the ratchet portion 47 engages with an optical connector-plug inserted from the rear end side of the frame holding hole 51 of the housing 50 to hold the optical connector-plug in the housing 50.

In the optical functioning component 10 as described above, its front end side is inserted and held in an optical connector-adaptor as shown in FIG. 1B. Inserting an optical connector-plug from the rear end side allows optical connector-plugs opposingly connected by means of the optical connector-adapter to be optically connected at a desired attenuation amount.

An optical connector-plug and an optical connector-adaptor 60 connected to the optical functioning component 10 will be described in detail hereinafter.

Figure 3:
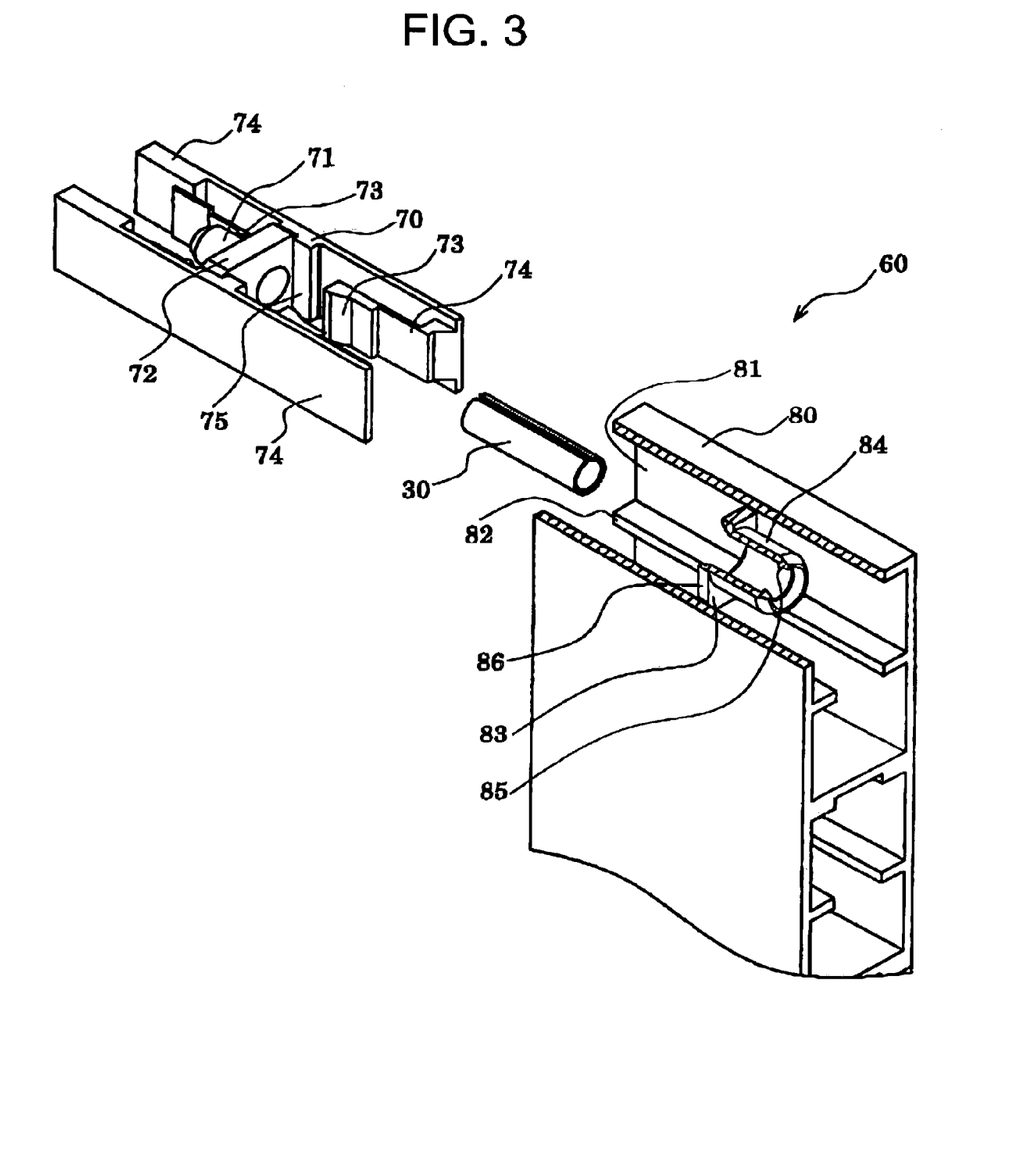
FIG. 3 is an exploded perspective view of an optical connector-adaptor according to a first embodiment of the invention.

An optical connector-adaptor 60 will be first described. FIG. 3 is an exploded perspective view of an optical connector-adaptor.

As shown in FIG. 3, an optical connector-adaptor 60 is an MU-type of optical connector-adaptor and comprises a sleeve holder 70 for holding an optical connection sleeve 30 and an adaptor housing 80 for holding the sleeve holder 70.

The optical connection sleeve 30 is formed from a metal material provided with a slit axially passing through the material like the optical functioning component 10.

The optical connection sleeve 30 is adapted to connect ferrule cylinders face to face when ferrule cylinders of optical connector-plugs or ferrule cylinders 21 of the optical functioning components 10 are inserted and held from the both ends of the optical connection sleeve 30.

The sleeve holder 70 includes a third cylinder 71 for holding an end side of the optical connection sleeve 30. The third cylinder 71 is provided at its axially one end with a stopper pawl not shown in the drawings for locking the optical connection sleeve 30, the stopper pawl projecting inside in a radial direction. On an outer circumference of the other end of the third cylinder 71, provided a first flange 72 having a rectangular shape.

A pair of ratchet portions 14, which is provided so as to respectively sandwich the third cylinder 71 and a fourth cylinder 84 of an adaptor housing 80 described later and which has lock pawls 73 at the top thereof, is provided on both of the shorter sides of the first flange 72. These ratchet portions 74 is used for connection with an optical connector-plug or an optical functioning component 10. Further, a concave 75 is provided on the opposite side surface to the third cylinder 71 of the first flange 72.

The adaptor housing 80 is provided in parallel with plural, eight in this embodiment, for example, sleeve holder holding holes 81 passing through the adaptor housing 80 for holding the sleeve holder 70. The sleeve holder holding hole 81 is provided on its one side with a groove 82, which can fit in with a projecting side of the first flange 72. In this embodiment, adjacent sleeve holder holding holes 81 are adapted to communicate with each other through the groove 82 in order to reduce a space between the adjacent sleeve holder holding holes 81 since a plurality of sleeve holder holding holes 81 are provided in parallel.

The sleeve holder holding hole 81 is provided on its opposite side to the insert direction of the first flange 72 in relation to the axially center portion in the sleeve holder holding hole 81 with a second flange 83 fitted in the concave 75 of the first flange 72 and a fourth cylinder 84 axially extended from the second flange 83. The fourth cylinder 84 is provided at its end with a stopper pawl 85 for locking the optical connection sleeve 30, the stopper pawl 85 projecting inside in a radial direction. On the other hand, the second flange 83 is provided on its both shorter sides with insert holes 86 into which the ratchet portion 74 is inserted.

The optical connector-adaptor 60 described above can be assembled by sandwiching the optical connection sleeve 30 between the third cylinder 71 and the fourth cylinder 84 so that the sleeve holder 70 would be inserted into the adaptor housing 80.

In the sleeve holder holding hole 81 of such optical connector-adaptor 60, the optical functioning component 10 or an optical connector-plug can be inserted and held therein.

More precisely, the lock pawl 73 of the ratchet portion 74 of the optical connector-adaptor 60 engages with the engagement projection 49 provided on the outer circumference of the frame 40 of the optical functioning component 10, so that the optical functioning component 10 can be held in the optical connector-adaptor 60.

In order to release the engagement between the optical connector-adaptor 60 and the optical functioning component 10, the housing 50 of the optical functioning component 10 should be pulled backward. Then, the housing 50 only moves to the rear side while the frame 40 does not move due to the lock pawl 73, so that a tapered surface, which is provided in an edge of the opening 52 and which is not shown in the drawings, pushes the lock pawl 73 up.

Furthermore, an optical connector-plug with a plug housing removed from a conventional MU-type of connector-plug is connected to the rear end side of the optical functioning component 10.

An optical connector-plug with a plug housing removed in this embodiment will be described hereinafter.

Figure 4:
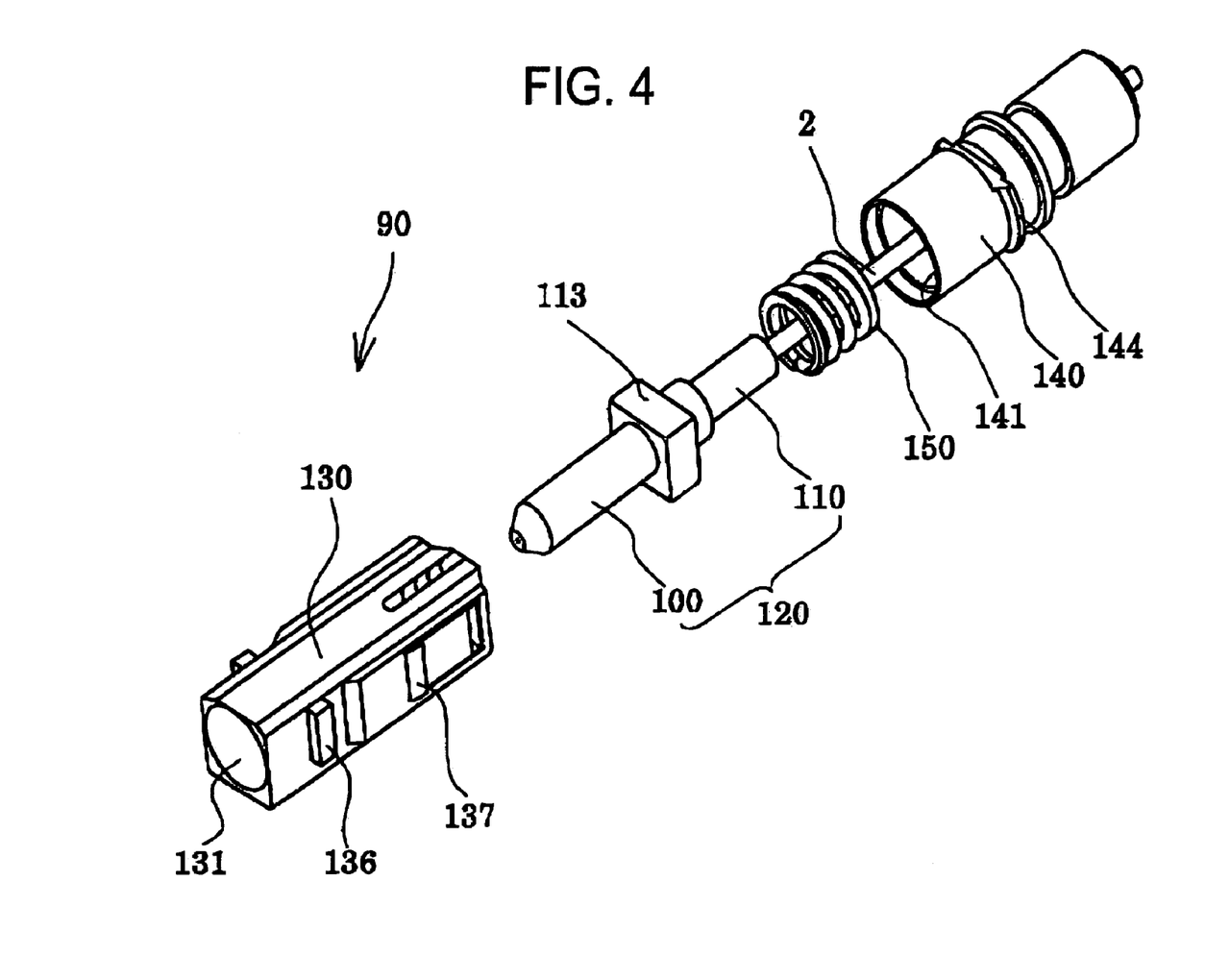
FIG. 4 is an exploded perspective view of an optical connector-plug according to a first embodiment of the invention.
Figure 5:
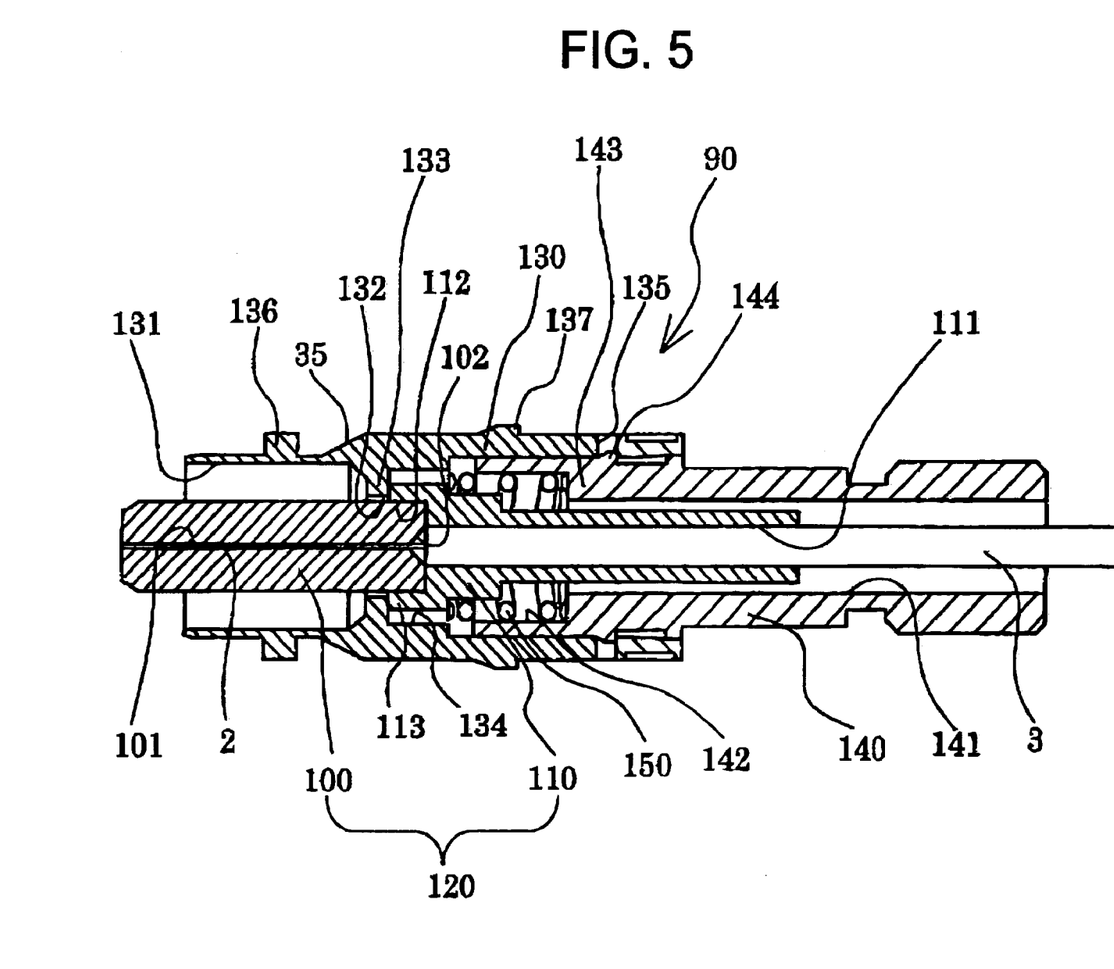
FIG. 5 is a longitudinally cross-sectional view of an optical connector-plug according to a first embodiment of the invention.

FIG. 4 is an exploded perspective view of an optical connector-plug. FIG. 5 is an axially cross-sectional view of an optical connector-plug.

As shown in FIGS. 4 and 5, an optical connector-plug 90 in this embodiment comprises a ferrule 120, which is fitted into the optical functioning component 10 or a plug housing not shown in the drawings and which comprises a ferrule cylinder 100 for holding an optical fiber 2 and a collar member 110, a plug frame 130 into which the ferrule 120 is inserted from the rear side thereof, a stop ring 140 whose front end engages with the rear end of the plug frame 130 and an urging spring 150 held between the ferrule 120 and the stop ring 140 for urging the ferrule 120 toward the axially front end side.

The ferrule 120 comprises the ferrule cylinder 100 for inserting and holding the optical fiber 2 and the collar member 110 fitted in with the rear end of the ferrule cylinder 100 for holding an optical fiber core wire 3 formed by covering the outer circumference of the optical fiber 2.

The ferrule cylinder 100 has a cylinder shape whose outer diameter is equal to that of the ferrule cylinder 100 of the optical functioning component 10, that is, 1.25 mm. The ferrule cylinder 100 is provided inside with an optical fiber insert hole 101 axially passing through the ferrule cylinder 100 for inserting and holding the optical fiber 2, for example. The optical fiber insert hole 101 is provided at its rear end with a tapered portion 102 whose inner diameter gradually increases toward its opening side. Providing such tapered portion 102 can allow the front end of the optical fiber 2 to be prevented from chipping or breaking due to contact with an end surface of the ferrule cylinder 100 when the optical fiber 2 is inserted into an optical fiber insert hole 102.

For such ferrule cylinder 100, a ceramic material such as zirconium, a plastic material and a glass material such as crystallized glass, boronic silica grass and quartz can be used, for example.

The collar member 110 fitted in with the rear end of the ferrule cylinder 100 has an optical fiber core wire insert portion 111 communicating with the optical fiber insert hole 101 for holding the optical fiber core wire 3 formed by covering the outer circumference of the optical fiber 2. The front end side of the optical fiber core wire insert portion 111 forms a large diameter portion 112 fitted in with the rear end of the ferrule cylinder 100. The rear end of the ferrule cylinder 100 is fitted in with the large diameter portion 112 to form the ferrule 120. The ferrule cylinder 100 and the collar member 110 can be fixed by means of pressure or adhesive.

Furthermore, the collar member 110 is provided on its outer circumferential surface with a collar portion 113, which projects in a circumferential direction and whose cross-section is in a rectangular shape. The collar portion 113 is fitted in with an engagement hole 134 having a cross-sectional surface in a shape roughly equal to the collar portion 113 when it is held in the plug frame 130, so that movement in a direction of rotation can be limited.

The plug frame 130 into which the ferrule 120 is inserted and held includes a ferrule insert hole 131 longitudinally passing through the plug frame 130 and is formed by a plastic material, for example, whose cross-sectional surface has a roughly rectangular outer shape. The ferrule insert hole 131 is provided with a projection flange 133, which has an inner diameter a little bit larger than the outer diameter of the ferrule cylinder 100 and on which a projection hole 132 that the ferrule cylinder 100 can only project is formed.

The ferrule insert hole 131 is also provided with an engagement hole 134, which is provided adjacently to the projection flange 133 and whose cross-sectional surface is in a roughly equal shape to the collar portion 113.

The ferrule 120 held in the ferrule insert hole 131 by means of the above engagement hole 134 is limited to move in a direction of rotation about a center axis.

On the plug frame 130, formed two lock holes 135, which communicate with the ferrule insert hole 131 and which opens to the outer circumference. The lock hole 135 is adapted to lock a lock portion 144 provided at the front end of the stop ring 140 described later.

The stop ring 140 is made of metal such as stainless or plastic, for example, which is formed into a cylinder shape having a through-hole 141 into which the rear end side of the collar member 110 can be inserted and which axially passes through the stop ring 140.

The through-hole 141 is provided on its front end side with an urging spring holding portion 142 into which the urging spring 150 can be inserted and whose inner diameter is large, so that an end of the urging spring 150 contacts with a contacting portion 143 formed by a bump due to difference in inner diameter of the urging spring holding portion 142 of the through-hole 141.

The other end of the urging spring 150 contacts with a rear end surface of the collar portion 113 of the collar member 110 so that the ferrule 120 would be urged forwardly in the axial direction in relation to the stop ring 140.

An outer circumference on the front end side of the stop ring 140 is provided with a lock portion 144, which projects in the lock hole 135 when the stop ring 140 is inserted in the ferrule insert hole 131 of the plug frame 130. The lock portion 144 is in a tapered shape that the amount of projection gradually decreases toward its front end. Expanding the rear end of the plug frame 130, the lock portion 144 enters the ferrule insert hole 131 so as to be locked by the lock hole 135.

In order to let the plug frame 130 having such structure hold the ferrule 120, the ferrule 120 holding the optical fiber 2 is inserted in the ferrule insert hole 131 of the plug frame 130, and then, the urging spring 150 having been inserted in advance in the fiber core wire 3 and the stop ring 140 are inserted in turn, so that the lock portion 144 of the stop ring 140 is locked in the lock hole 135 of the plug frame 130. The stop ring 140 is thus fixed in the plug frame 130. At that time, an end surface on the front end side of the collar portion 113 of the ferrule 120 contacts with the projection flange 133 of the plug frame 140, and thereby, the ferrule 120 is limited to move to the front end side while it is assembled so as to project by a predetermined amount from the projection hole 132 of the projection flange 133 and so as to be held and urged toward the axially front side.

Moreover, the plug frame 130 of the optical connector-plug 90 so assembled is provided in its outer circumference with an engagement projection 136 and a lock projection 137, the engagement projection 136 engaging with a conventional plug housing not shown in the drawings or the optical functioning component 10.

When such optical connector-plug 90 is inserted in the frame holding hole 51 of the optical functioning component 10, the engagement projection 136 engages with the lock pawl 46 of the ratchet portion 47 of the frame 40 and the lock projection 137 contacts with an edge of the opening 52 of the housing 50, so that the optical connector-plug 90 is certainly held in the optical functioning component 10.

In the connection between the optical connector-plug 90 and the optical functioning component 10, tensile strength is required to be 70 N or more. The connection between the optical connector-plug 90 and the optical functioning component 10 is achieved by engagement between the lock pawl 46 and the engagement projection 136 and between the opening 52 and the lock projection 137, and thus, is not easily released.

Figure 6:
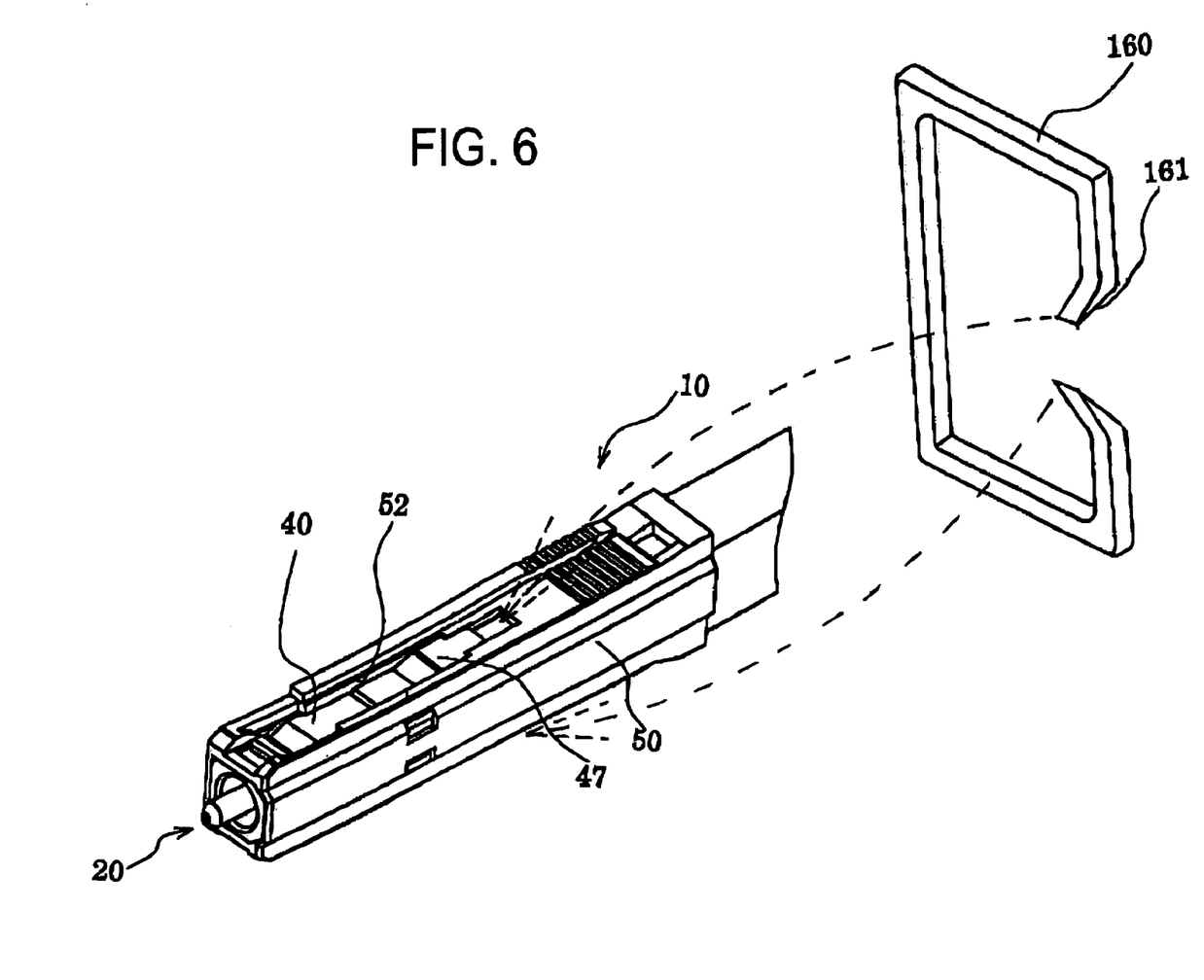
FIG. 6 is a perspective view of an optical functioning component and a jig according to a first embodiment of the invention.

In order to release the connection between the optical connector-plug 90 and the optical functioning component 10, a jig shown in FIG. 6 can be used, for example.

The jig 160 shown in FIG. 6 is in a shape having a roughly rectangular curve and has both ends 161 curving so as to project in its thickness direction. The front ends of the both ends 161 are tapered. Inserting the front ends between the housing 50 of the optical functioning component 10 and the plug frame 130 of the optical connector-plug 90 allows a gap to be formed between the housing 50 and the plug frame 130, so that engagement is released between the lock projection 137 of the plug frame 130 and the opening 52 of the housing 50.

As described above, in the optical functioning component 10 according to this embodiment, the front end side is connected to the optical connector-adaptor 60 while the rear end side is connected to the optical connector-plug 90 with a plug housing removed. Accordingly, the housing 50 of the optical functioning component 10 can be formed so as to be of an equal width to a plug housing of the optical connector-plug, and thereby, a space between connecting portions formed by the sleeve holder holding hole 81 of the optical connector-adaptor 60 can be made small. Therefore, it is possible to achieve miniaturization and to decrease the number of parts of the optical functioning component 10 and the optical connector-plug 90 as well as shorten the length of the ferrule, which can reduce a manufacturing cost.

Furthermore, using such optical functioning component 10 allows an optical connector-adaptor using no optical functioning component 10 and an optical connector-adaptor using an optical functioning component 10 to be used together in the same shape, which can reduce a manufacturing cost.

Moreover, since the optical connector-plug 90 with a plug housing removed is held at the rear end of the optical functioning component 10, the strength of the housing 50 of the optical functioning component 10 can be secured enough even when a space between the connecting portions formed by the sleeve holder holding hole 81 of the optical connector-adaptor 60 is made small.

In addition, the optical functioning component 10 per se can be miniaturized, so that an expensive attenuation fiber 1 can be shortened, which can reduce a cost.

(Other Embodiments)

The embodiment 1 of the invention has been described above. The basic structure of an optical functioning component, however, is not limited to the above.

For example, the above-described embodiment 1 exemplified an optical functioning component used for an MU-type. The invention is, however, not limited to the above. The optical functioning component may be used for such as an SC-type in which an outer diameter of a ferrule cylinder is 2.5 mm, for example. In the case of the SC-type, adopting the invention allows the number of parts to be decreased, so that a manufacturing cost can be reduced, although a housing of a conventional optical functioning component has also maintained enough strength even when a space provided in parallel between connecting portions of an optical connector-adaptor is made small.

In the above-described embodiment 1, the ferrule cylinder 21 holding an attenuation fiber 1 or a fiber capable of cutting off, reflecting or absorbing a specific wavelength of light is used for a ferrule 20 having an attenuation mechanism or a mechanism capable of cutting off, reflecting or absorbing a specific wavelength of light. The invention is, however, not limited to the above. It is possible to use an attenuation filter comprising an optical absorber or a filter comprising dielectric multi-layer film cutting off, reflecting or absorbing a specific wavelength of light.

As described above, in the optical functioning component according to the invention having front and rear end sides, an optical connector-adaptor is connected to the front end side while an optical connector-plug with an adaptor housing removed can be held on the rear end side, so that miniaturization can be achieved and manufacturing cost reduced. Furthermore, a space between connecting portions in which an optical connector-adaptor is connected with an optical functioning component can be made equal to that of connecting portions in which an optical connector-plug is connected so that the number of parts can be decreased and manufacturing costs reduced while the strength of an area holding an optical connector-plug can be secured enough.

What is claimed is:

1. An optical functioning component comprising:
   a tubular housing having a front end side for connection to an optical connector adaptor and a rear end side, the front end side having substantially the same shape as that of a front end of a removable plug housing of an optical connector plug connectable to the optical connector adaptor, and the rear end side of the tubular housing having a shape configured for connection to the optical connector plug when the plug housing is removed from the optical connector plug;
   a ferrule provided on the front end side of the tubular housing and having a mechanism capable of attenuating, cutting-off, reflecting or absorbing a specific wavelength of light;
   an optical connection sleeve connected to an end of the ferrule; and
   a frame supporting the ferrule and the optical connection sleeve and mounted in the tubular housing for undergoing axial movement therein by a preselected amount.

2. An optical functioning component according to claim 1; wherein the ferrule comprises a generally cylindrical member and a collar member mounted around a generally central outer circumferential portion of the cylindrical member.

3. An optical functioning component according to claim 2; wherein the mechanism capable of attenuating, cutting-off, reflecting or absorbing a specific wavelength of light comprises a fiber supported by the cylindrical member and capable of attenuating, cutting off, reflecting or absorbing a specific wavelength of light.

4. An optical functioning component according to claim 3; wherein the mechanism capable of attenuating, cutting-off, reflecting or absorbing a specific wavelength of light comprises an attenuation fiber comprised of a metal-doped optical fiber.

5. An optical functioning component according to claim 4; wherein the cylindrical member has an outer diameter of 1.25 mm or 2.5 mm; and wherein the metal-doped optical fiber has an axial length in the range of 10 mm to 15 mm.

6. An optical functioning component according to claim 3; wherein the rear end side of the tubular housing has an opening for receiving a lock projection of a plug frame of the optical connector plug to connect the rear end side of the tubular housing to the optical connector plug, the tubular housing and the plug frame being configured to receive therebetween respective end portions of a jig to release the locking projection of the plug frame from the opening of the tubular housing to thereby disconnect the optical connector plug from the tubular housing.

7. An optical functioning component according to claim 3; wherein the cylindrical member has an outer diameter of 1.25 mm or 2.5 mm; and wherein the fiber has an axial length in the range of 10 mm to 15 mm.

8. An optical functioning component according to claim 2; wherein the attenuation mechanism or the mechanism capable of attenuating, cutting-off, reflecting or absorbing a specific wavelength of light comprises a filter supported by the cylindrical member and capable of attenuating, cutting off, reflecting or absorbing a specific wavelength of light.

9. An optical functioning component according to claim 2; wherein the rear end side of the tubular housing has an opening for receiving a lock projection of a plug frame of the optical connector plug to connect the rear end side of the tubular housing to the optical connector plug, the tubular housing and the plug frame being configured to receive therebetween respective end portions of a jig to release the locking projection of the plug frame from the opening of the tubular housing to thereby disconnect the optical connector plug from the tubular housing.

10. An optical functioning component according to claim 1; wherein the mechanism capable of attenuating, cutting-off, reflecting or absorbing a specific wavelength of light comprises a filter supported by the cylindrical member and capable of attenuating, cutting off, reflecting or absorbing a specific wavelength of light.

11. An optical functioning component according to claim 10; wherein the rear end side of the tubular housing has an opening for receiving a lock projection of a plug frame of the optical connector plug to connect the rear end side of the tubular housing to the optical connector plug, the tubular housing and the plug frame being configured to receive therebetween respective end portions of a jig to release the locking projection of the plug frame from the opening of the tubular housing to thereby disconnect the optical connector plug from the tubular housing.

12. An optical functioning component according to claim 1; wherein the rear end side of the tubular housing has an opening for receiving a lock projection of a plug frame of the optical connector plug to connect the rear end side of the tubular housing to the optical connector plug, the tubular housing and the plug frame being configured to receive therebetween respective end portions of a jig to release the locking projection of the plug frame from the opening of the tubular housing to thereby disconnect the optical connector plug from the tubular housing.

13. An optical functioning component according to claim 1; wherein each of the optical connector plug and the optical connector adaptor is of an SC-type or a MU-type.

14. An optical functioning component according to claim 1; wherein a cross-sectional area of the front end side of the tubular housing is substantially equal to that of the front end of the plug housing of the optical connector plug.

15. An optical connector comprising:
    an optical adapter;
    at least one optical connector plug having a removable plug housing for removable connection to the optical adapter; and
    at least one optical functioning component comprised of a tubular housing having a front end side for connection to the optical connector adaptor and with substantially the same shape as that of a front end of the removable plug housing of the optical connector plug and a rear end side with a shape configured for connection to the optical connector plug when the plug housing is removed from the optical connector plug, a ferrule provided on the front end side of the tubular housing and having a mechanism for attenuating, cutting-off, reflecting or absorbing a specific wavelength of light, an optical connection sleeve connected to an end of the ferrule, and a frame supporting the ferrule and the optical connection sleeve and mounted in the tubular housing for undergoing axial movement therein by a preselected amount.

16. An optical connector according to claim 15; wherein the ferrule comprises a generally cylindrical member and a collar member mounted around a generally central outer circumferential portion of the cylindrical member.

17. An optical connector according to claim 15; wherein the mechanism for attenuating, cutting-off, reflecting or absorbing a specific wavelength of light comprises an attenuation fiber supported by the cylindrical member.

18. An optical connector according to claim 17; wherein the attenuation fiber comprises a metal-doped optical fiber.

19. An optical connector according to claim 17; wherein the cylindrical member has an outer diameter of 1.25 mm or 2.5 mm; and wherein the attenuation fiber has an axial length in the range of 10 mm to 15 mm.

20. An optical connector according to claim 15; wherein the mechanism for attenuating, cutting-off, reflecting or absorbing a specific wavelength of light comprises an attenuation filter supported by the cylindrical member.

21. An optical connector according to claim 15; wherein the rear end side of the tubular housing has an opening for receiving a lock projection of the plug frame of the optical connector plug to connect the rear end side of the tubular housing to the optical connector plug, the tubular housing and the plug frame being configured to receive therebetween respective end portions of a jig to release the locking projection of the plug frame from the opening of the tubular housing to thereby disconnect the optical connector plug from the tubular housing.

22. An optical connector according to claim 15; wherein each of the optical connector plug and the optical connector adaptor is of an SC-type or a MU-type.

23. An optical connector according to claim 15; wherein a cross-sectional area of the front end side of the tubular housing is substantially equal to that of the front end of the plug housing of the optical connector plug.

24. An optical connector according to claim 15; wherein the at least one optical connector plug comprises a plurality of optical connector plugs each having a plug housing for removable connection to the optical adapter; and wherein the at least one optical functioning component comprises a plurality of optical functioning components each having a front end side for connection to the optical connector adaptor and with substantially the same shape as that of a front end of the plug housing of a respective one of the optical connector plugs, and each of the functioning components having a rear end side with a shape substantially the same as that of the plug housing of a respective one of the optical connector plugs so that a space between adjacent optical functioning components is reduced when the optical functioning components are connected to the optical connector adaptor in parallel relation to one another.

* * * * *